(12) United States Patent
Lee et al.

(10) Patent No.: US 12,154,257 B2
(45) Date of Patent: Nov. 26, 2024

(54) DETECTING AND MITIGATING ARTIFACTS RELATED TO HIGH CHROMATIC COLORS

(71) Applicant: ATI Technologies ULC, Markham (CA)

(72) Inventors: Keith Lee, Markham (CA); Isobel Lees, Toronto (CA)

(73) Assignee: ATI Technologies ULC, Markham (CA)

( * ) Notice: Subject to any disclaimer, the term of this patent is extended or adjusted under 35 U.S.C. 154(b) by 268 days.

(21) Appl. No.: 17/523,762

(22) Filed: Nov. 10, 2021

(65) Prior Publication Data

US 2023/0144311 A1 May 11, 2023

(51) Int. Cl.
*G06K 9/00* (2022.01)
*G06T 5/00* (2006.01)
*G06T 5/92* (2024.01)

(52) U.S. Cl.
CPC .............. *G06T 5/92* (2024.01); *G06T 5/00* (2013.01); *G06T 2207/20024* (2013.01); *G06T 2207/20224* (2013.01)

(58) Field of Classification Search
CPC .......... H04N 9/646; H04N 9/64; H04N 19/86; G06T 5/003; G06T 2207/10024; G06T 5/006; G06T 2207/20012; G06T 2207/20024; G06T 2207/20224; G06T 5/002; G06T 5/009; G06V 10/30
See application file for complete search history.

(56) References Cited

U.S. PATENT DOCUMENTS

| 5,130,786 A | 7/1992 | Murata et al. |
| 6,384,872 B1* | 5/2002 | Tsui ............... H04N 7/0132 348/625 |

(Continued)

FOREIGN PATENT DOCUMENTS

WO 9960793 A1 11/1999

OTHER PUBLICATIONS

Lachine, V., Lee, L., & Smith, G. (Oct. 2012). Content adaptive enhancement of video images. In Applications of Digital Image Processing XXXV (vol. 8499, pp. 574-582). SPIE. (Year: 2012).*

(Continued)

*Primary Examiner* — Gregory A Morse
*Assistant Examiner* — Kevin M Coomber
(74) *Attorney, Agent, or Firm* — Kowert, Hood, Munyon, Rankin & Goetzel, P.C.; Rory D. Rankin

(57) ABSTRACT

Systems, apparatuses, and methods for detecting and mitigating scaling artifacts caused by high chromatic colors in adjacent pixels are disclosed. A blend factor calculation circuit determines if high chromatic colors are in close proximity to each other in a set of pixel data of an image or frame. The blend factor calculation circuit generates a blend factor value to suppress artifacts which are introduced when filtering the set of pixel data when the set of pixel data has high chromatic colors in close proximity. In one scenario, the blend factor calculation circuit calculates pixel component difference values of adjacent pixels and uses a value calculated based on the difference values as an input to a transfer function. The output of the transfer function is a blend factor value which determines how filtering is blended between a plurality of filters.

20 Claims, 11 Drawing Sheets

(56) References Cited

U.S. PATENT DOCUMENTS

| | | | |
|---|---|---|---|
| 8,837,006 B2 | 9/2014 | McDowell et al. | |
| 8,842,741 B2 * | 9/2014 | Schoner | H04N 19/86 375/240.27 |
| 10,244,245 B2 | 3/2019 | Rusanovskyy et al. | |
| 10,694,129 B2 * | 6/2020 | Cote | H04N 1/60 |
| 2009/0147111 A1 * | 6/2009 | Litvinov | G06T 5/003 348/E9.002 |
| 2009/0226084 A1 | 9/2009 | Courchesne et al. | |
| 2015/0227540 A1 | 8/2015 | Lin et al. | |
| 2021/0144408 A1 * | 5/2021 | Giladi | H04N 19/85 |
| 2023/0096874 A1 * | 3/2023 | Lee | G06T 5/006 382/100 |

OTHER PUBLICATIONS

Chan et al., U.S. Appl. No. 17/562,777, entitled "Color Channel Correlation Detection", filed Dec. 27, 2021, 32 pages.

* cited by examiner

*MMRGB12*
*dR = R1-R2, dG = G1-G2, dB = B1-B2*
*Max = max(dR, dG, dB), Min = min(dR, dG, dB)*
*MMRGB12 = Max − Min*
*MMRGB12 may be set to 0 if the number of taps for scaling is even*

*MMRGB23*
*dR = R2-R3, dG = G2-G3, dB = B2-B3*
*Max = max(dR, dG, dB), Min = min(dR, dG, dB)*
*MMRGB23 = Max − Min*

*Chroma RGB*
*chrRGB1 = max(R1,G1,B1) - min(R1,G1,B1)*
*(Only calculated if number of taps is not even)*
*chrRGB1 may be set to 0 if number of taps for scaling is even*
*chrRGB2 = max(R2,G2,B2) - min(R2,G2,B2)*
*chrRGB3 = max(R3,G3,B3) - min(R3,G3,B3)*

*ChromaFixMul12*
*if CF2Enable*
    *ChromaFixMul12 = MMRGB12\*chrRGB1\*chrRGB2*
*else*
    *ChromaFixMul12 = MMRGB12*
*end*

*ChromaFixMul23*
*if CF2Enable*
    *ChromaFixMul23 = MMRGB23\*chrRGB2\*chrRGB3*
*else*
    *ChromaFixMul23 = MMRGB23*
*end*

*CFMul*
*if 3-tap*
    *CFMul = max(ChromaFixMul12, ChromaFixMul23)*
*else*
    *CFMul = ChromaFixMul23*
*End*

*BFA = PWL(CFMul)*
*BF = abs(BFA)*

*if BFEnable*
    *UseSharpNaro = sign(BFA)*
*else*
    *UseSharpNaro = 0*
*end*

805
                        ┌─┘
        ┌─────────────────────────────────┐
        │  Perform, by a Blend Factor     │
        │  Calculation Unit, a Plurality of│
        │ Calculations to Determine Whether│
        │  Two Brightly Lit Pixels Having │
        │  Significantly Different Hues are│
        │  Adjacent to Each Other in a Set of│
        │              Pixel Data          │
        └─────────────────────────────────┘
                        │
                        ▼       810
                                ┌─┘
        ┌─────────────────────────────────┐
        │  Generate a Blend Factor Value to│
        │ Suppress Visual Artifacts if Two │
        │    Brightly Lit Pixels Having   │
        │  Significantly Different Hues are│
        │ Adjacent to Each Other in the Set of│
        │              Pixel Data          │
        └─────────────────────────────────┘
                        │
                        ▼       815
                                ┌─┘
        ┌─────────────────────────────────┐
        │  Blend, by a Blend Circuit, Filtering│
        │  of the Set of Pixel Data Between a │
        │     First Filter and a Second Filter│
        │  based on the Blend Factor Value so │
        │  as to Generate Blended Pixel Data  │
        └─────────────────────────────────┘
                        │
                        ▼       820
                                ┌─┘
        ┌─────────────────────────────────┐
        │  Drive the Blended Pixel Data to a │
        │              Display             │
        └─────────────────────────────────┘
```

FIG. 8

DETECTING AND MITIGATING ARTIFACTS RELATED TO HIGH CHROMATIC COLORS

BACKGROUND

Description of the Related Art

Images and video frames undergo various stages of processing within an image, graphics, or video processing pipeline. When undergoing processing, the image and video frames can be encoded in different color spaces, with red, green, and blue (RGB) and luma-chroma (YCbCr) two of the more common color spaces. Also, the image/video frame can be encoded in linear or non-linear space, which can impact how the image/frame is processed. In some cases, an image is referred to as being perceptual quantization (PQ) encoded, which means the image is in non-linear space. Also, when an image is described as being "gamma encoded" or having "gamma encoding", this implies that the image is in non-linear space.

Ringing can occur in digital image processing, creating undesired ringing artifacts. As used herein, the term "ringing" is defined as the generation of artifacts that appear as spurious pixel values near sharp edges or discontinuities in the input pixel data of an image or video frame. Ringing is often introduced to an image near sharp transitions in the original pixel values after different types of image processing algorithms have processed the image. Depending on the image and the processing algorithm, ringing artifacts can vary from desirable to unnoticeable to annoying.

BRIEF DESCRIPTION OF THE DRAWINGS

The advantages of the methods and mechanisms described herein may be better understood by referring to the following description in conjunction with the accompanying drawings, in which:

FIG. 7 is one example of pseudocode for calculating a chroma fix value in accordance with one implementation.

FIG. 8 is a generalized flow diagram illustrating one implementation of a method for suppressing visual artifacts when two brightly lit colors having significantly different hues are adjacent to each other.

DETAILED DESCRIPTION OF IMPLEMENTATIONS

Figure 1:
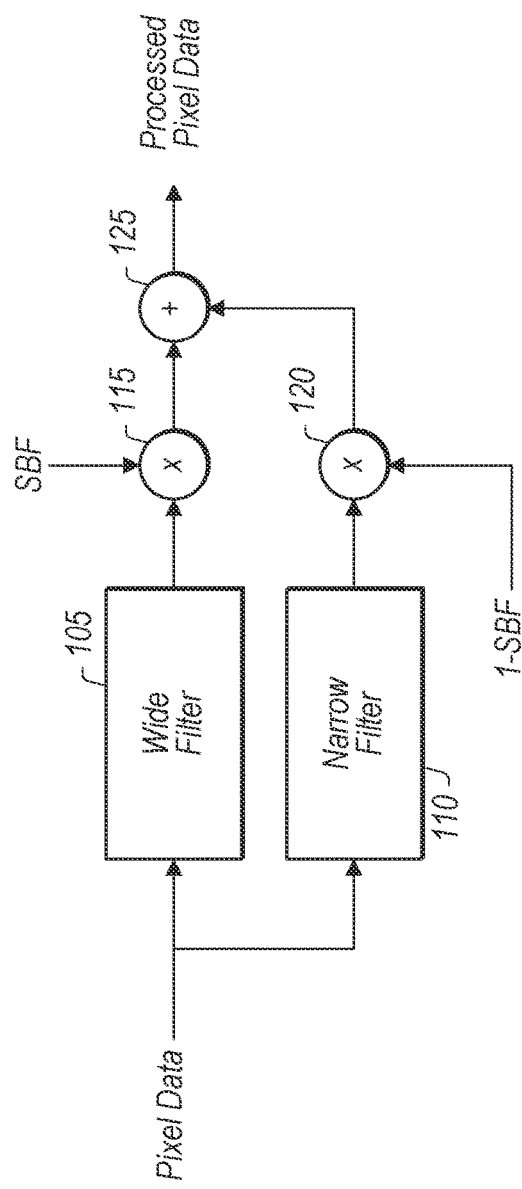
FIG. 1 is a block diagram of one implementation of a chroma fix image processing mechanism.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for detecting and mitigating scaling artifacts caused by high chromatic colors in adjacent pixels are disclosed herein. When processing (e.g., scaling, sharpening) images, if two brightly colored pixels are next to each other, a black or white line can be produced when these two brightly colored pixels are blended. This creates a noticeable visual artifact that can negatively affect the user experience. Accordingly, mechanisms are presented herein for detecting cases where these types of artifacts are likely to occur, and mechanisms are presented herein for mitigating these cases. These types of cases are referred to as chroma fix conditions, with a plurality of different types of chroma fix conditions causing various types of visual artifacts during processing. For example, in one implementation, if a chroma fix condition is detected for a set of pixel data of an image prior to scaling, this indicates that a sharper filter should be used. The sharper filter can be used whether performing linear or non-linear scaling.

In one implementation, a blend factor calculation circuit detects if high chromatic colors of different hue are in close proximity to each other in a set of pixel data of an image or frame. The blend factor calculation circuit generates a blend factor value to suppress artifacts which are introduced when filtering the set of pixel data when the set of pixel data has high chromatic colors of different hue in close proximity. In one scenario, the blend factor calculation circuit calculates chrominance difference values of adjacent pixels and uses a value calculated based on the difference values as an input to a piece-wise linear (PWL) function. The blend factor calculation circuit can use a PWL function that is specific to the particular format of the input pixel data. The blend factor value is generated for each set of source pixels based at least on the chromatic calculations generated by the blend factor calculation unit. The blend factor value is then applied to how blending is mixed between narrow and wide filters for the corresponding set of pixel data. The blend factor calculation circuit can also select between different sets of narrow and wide filters based on the degree (i.e., extent) to which the high chromatic colored adjacent pixels have different hues.

In one implementation, the blend factor calculation circuit determines if a chroma fix condition is detected in a group of input pixel data. If a chroma fix condition is detected, artifacts that will be generated when filtering the pixel group. The input pixel data group can include any number of pixels or sub-pixels, with the number of pixels or sub-pixels varying according to the implementation. Depending on the implementation, the blend factor calculation circuit can analyze whether any of multiple different types of chroma fix conditions have been detected. For example, in one implementation, the input pixel data is analyzed to determine whether two different types of chroma fix conditions are detected. In this implementation, a first type of chroma fix condition is having adjacent high chrominance colored pixels with different hues, and a second type of chroma fix condition is when a highly chromatic color is side-by-side with a bright achromatic (or within a threshold of achromatic) color. For example, a brightly colored yellow pixel adjacent to a brightly colored purple pixel would constitute the first type of chroma fix condition. Also, a brightly colored red pixel adjacent to a bright grey pixel would constitute the second type of chroma fix condition. In other implementations, the blend factor calculation circuit searches for other types of chroma fix conditions.

In one implementation, if one or more chroma fix conditions are detected in the input pixel data, then a blend factor calculation circuit generates an intermediate blend factor value which will influence the blending of filter outputs used for generating a final filtered pixel value to represent the input pixel data. The intermediate blend factor value can be used by itself or with one or more other intermediate blend factor values to generate a final blend factor value. The final blend factor value is generated for each set of source pixels based on this determination. In one implementation, the final blend factor value is applied to how blending is mixed between a narrow filter and a wide filter during image processing for the corresponding set of source pixels. The preferred blending between the narrow filter and the wide filter is changeable for each set of source pixels during image processing. Also, in one implementation, the blend factor value is changeable for each destination pixel.

In one implementation, the intermediate blend factor value is generated by applying a PWL function to a chroma fix value. In other implementations, other types of transfer functions are used to generate the intermediate blend factor value from the chroma fix value. In one implementation, the chroma fix value is generated based on a plurality of calculations applied to the input pixel data. In one implementation, the plurality of calculations include a series of subtraction operations and multiplication operations. Also, in one implementation, the type of narrow filter that is selected for filtering the input pixel data is selected based on the sign (positive or negative) of the chroma fix value. For example, if the chroma fix value is greater than or equal to zero, a first narrow filter is used. Otherwise, if the chroma fix value is less than zero, a second narrow filter different from the first narrow filter is used.

Referring now to FIG. 1, a block diagram of one implementation of a chroma fix image processing mechanism 100 is shown. Chroma fix image processing mechanism 100 receives an input image or video frame in any suitable format. The pixel data of the image/frame can be in a linear or non-linear (i.e., gamma or perceptual quantizer (PQ) encoded) format, RGB or YCbCr color space, or other formats and/or color spaces. In some cases, the input image can be converted to a different format or color space before being converted back to the original format and color space afterward. In one implementation, chroma fix image processing mechanism 100 is a scaler mechanism which scales (e.g., upscales, downscales) the input pixel data. In other implementations, chroma fix image processing mechanism 100 performs other types of processing (e.g., sharpening) of the input pixel data.

As shown in FIG. 1, chroma fix image processing mechanism 100 includes two filters—wide filter 105 and narrow filter 110. In other implementations, chroma fix image processing mechanism 100 can include more than two different types of filters. In the implementation shown in FIG. 1, wide filter 105 filters the input pixel data using a relatively high number of taps while narrow filter 110 filters the input pixel data using a relatively low number of taps. For example, in one implementation, wide filter 105 is a 6-tap filter while narrow filter 110 is a 2-tap filter. In other implementations, wide filter 105 and/or narrow filter 110 can have other numbers of taps. As used herein, the term "wide filter" is defined as a filter having a first number of taps, where the first number of taps is greater than a first threshold. The first threshold can vary from implementation to implementation. The number of taps refers to filter taps which corresponds to the number of coefficients that are applied to (i.e., multiplied by) values of pixels or sub-pixels of the input pixel data and then summed together. Also, as used herein, the term "narrow filter" is defined as a second filter having a second number of taps, where the second number of taps is less than a second threshold, with the second threshold being less than the first threshold. The value of the second threshold can vary from implementation to implementation.

The output of wide filter 105 is coupled to multiplier 115 to be multiplied by a scaled blend factor (SBF), while the output of narrow filter 110 is coupled to multiplier 120 to be multiplied by (1-SBF). The outputs of multiplier 115 and 120 are added together by adder 125, with the output of adder 125 being the processed pixel data. In other implementations, SBF may take on other ranges besides (0-1) and the SBF may be applied in other suitable manners to the outputs of wide filter 105 and narrow filter 110 in these implementations. SBF is generated to suppress visual artifacts that are predicted to be produced for the input pixel data. For example, when scaling or sharpening images, if two brightly colored pixels are next to each other, blending these pixels can produce a black line (if scaling in non-linear space) or a white line (if scaling in linear space). To prevent the spurious black or white line, a chroma fix value is generated to influence the value of SBF.

Throughout the remainder of this disclosure, different techniques for determining how to generate the chroma fix value and the eventual SBF value will be presented. These techniques include performing multiple different steps, such as detecting a chroma fix condition, generating a chroma fix value to suppress the chroma fix condition, and so on. Also, it should be understood that the structure and components of chroma fix image processing mechanism 100 are merely indicative of one particular implementation. Other chroma fix image processing mechanisms with other components structured in other suitable manners will also be presented throughout this disclosure. For example, in another implementation when employing a two-dimensional (2D) non-separable filter, a single blend factor is calculated based on a set of pixels in two dimensions instead of calculating one vertical blend factor and one horizontal blend factor.

Figure 2:
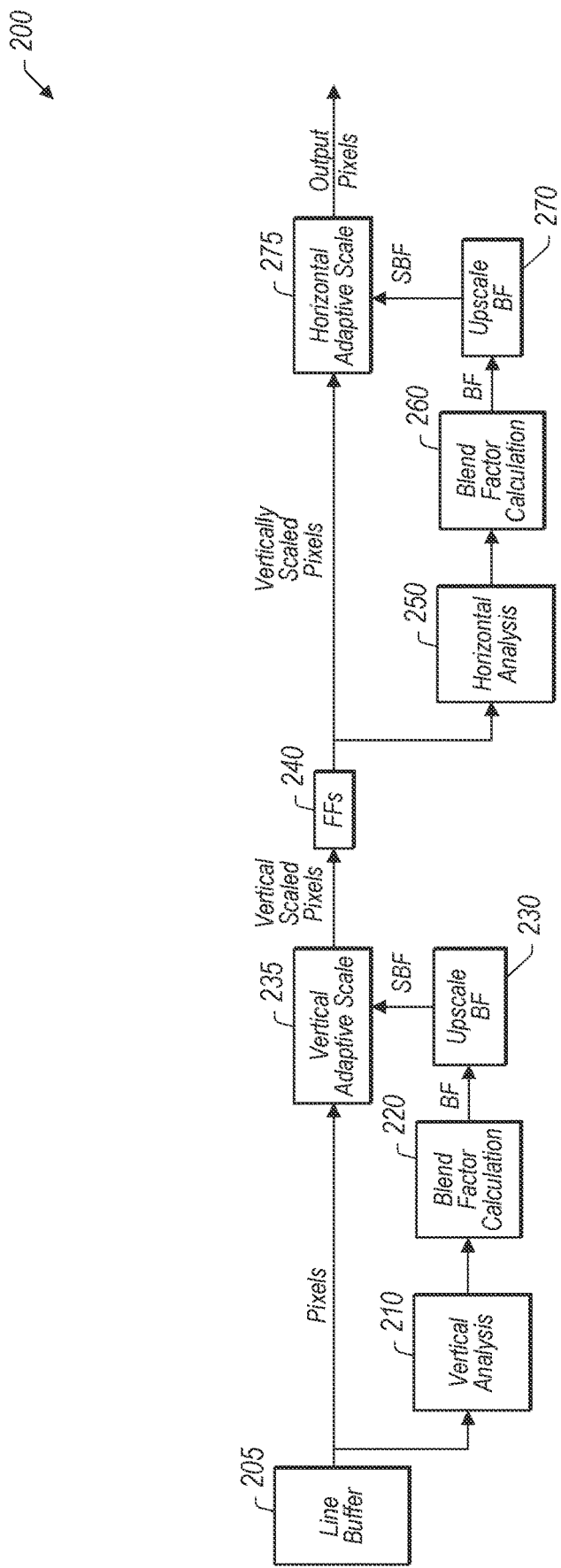
FIG. 2 is a block diagram of one implementation of a chroma fix image scaling mechanism.

Turning now to FIG. 2, a block diagram of one implementation of a chroma fix image scaling mechanism 200 is shown. While chroma fix image scaling mechanism 200 is depicted as a scaling mechanism, it should be understood that this is merely one particular implementation. In other implementations, chroma fix image scaling mechanism 200 can employ other types of processing functions besides scaling functions.

In one implementation, input pixels are retrieved from line buffer 205 and provided to vertical analysis unit 210. Depending on the implementation, the color space in which the pixel data is represented can be the RGB color space, the YCbCr color space, or any of various other types of color spaces. Conversions of the pixel data from one format or color space to another format or color space can occur in various implementations. Vertical analysis unit 210 receives the input pixels and performs an analysis, in the vertical direction, of the chroma components of the input pixels, with the results of the analysis provided to blend factor calculation unit 220. In one implementation, vertical analysis unit 210 performs a plurality of subtraction and multiplication operations to determine if two brightly lit pixels with widely different colors are adjacent to each other. Based on the results of the analysis, blend factor calculation unit 220 generates a blend factor value to determine how to blend scaling between at least two different scalers. Although vertical analysis unit 210 and blend factor calculation unit 220 are shown as separate units, it should be understood that this is merely representative of one particular implementation. In another implementation, vertical analysis unit 210 and blend factor calculation unit 220 are combined together into a single unit. It is noted that vertical analysis unit 210 and blend factor calculation unit 220 can also be referred to as vertical analysis circuit 210 and blend factor calculation circuit 220, respectively.

The blend factor generated by blend factor calculation unit 220 is upscaled by upscale unit 230 and then provided to vertical adaptive scaler 235. The blend factor is generated per set of source pixels to suppress any artifacts which would be caused by one or more chroma fix conditions. In one implementation, when the blend factor is 0, only the narrow filter will be used, which yields fewer artifacts caused by any detected chroma fix condition(s). In one implementation, when the blend factor is 1 (or the maximum value for other ranges besides 0-1), then only the wide filter is used, which provides the best image reconstruction quality when a chroma fix condition is not detected. Other implementations can reverse the above described blend factor value designation and/or use other blend factor ranges.

In one implementation, vertical adaptive scaler 235 includes filter components which are similar to the components and structure of chroma fix image processing mechanism 100. For example, in one implementation, vertical adaptive scaler 235 includes a wide filter and a narrow filter, with the blend factor determining how much the wide filter is used versus the narrow filter. Generally speaking, if a chroma fix condition is not detected, then the blend factor will cause filtering to be biased toward the wide filter. Otherwise, if a chroma fix condition is detected, the blend factor will be weighted toward the narrow filter. The outputs of the vertical adaptive scaler 235 are vertically scaled pixels which are provided to flip-flops 240, with the vertically scaled pixel outputs of flip-flops 240 provided to horizontal analysis unit 250 and horizontal adaptive scaler 275.

Similar to the vertical analysis performed by vertical analysis unit 210, horizontal analysis unit 250 receives the pixels and determines whether a chroma fix condition is detected in the horizontal direction. Horizontal analysis unit 250 provides the results of the horizontal analysis to blend factor calculation unit 260. Based on the horizontal analysis results, blend factor calculation unit 260 generates a blend factor which is upscaled by upscale unit 270 and then provided to horizontal adaptive scaler 275. In one implementation, horizontal adaptive scaler 275 uses the scaled blend factor (SBF) to determine how to balance filtering between a wide filter and a narrow filter. Horizontal adaptive scaler 275 generates output pixels which can undergo additional processing before being displayed or stored.

Figure 3:
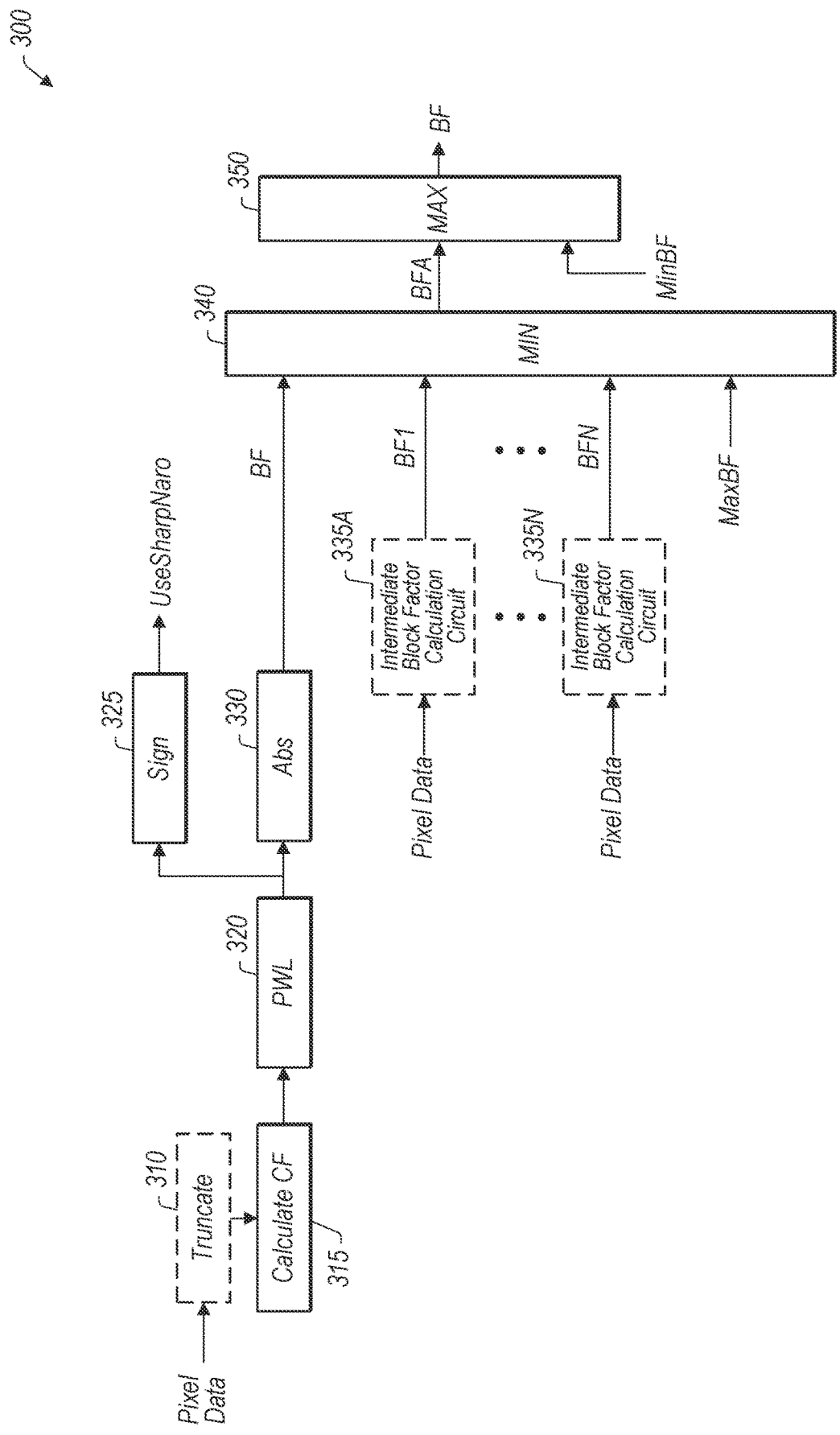
FIG. 3 is a block diagram of one implementation of a blend factor calculation circuit.

Referring now to FIG. 3, a block diagram of one implementation of a blend factor calculation circuit 300 is shown. Blend factor calculation circuit 300 receives pixel data of an image or video frame. In some cases, blend factor calculation circuit 300 receives a set of adjacent pixels per cycle from the image/frame. These adjacent pixels can be adjacent in the vertical direction or adjacent in the horizontal direction. In other cases, blend factor calculation circuit 300 receives a block of pixels from the image/frame. In one implementation, the input pixel data is in the RGB color space. In other implementations, the input pixel data can be encoded in other color spaces.

The pixel data of an input image/frame is coupled to optional truncate unit 310 to be truncated in cases when the data width is meant to be reduced for subsequent processing purposes. For example, if the input data width is 12-bits per pixel component and the processing components of blend factor calculation circuit 300 have a bit width of 8-bits, then truncate unit 310 would drop the bottom 4-bits per pixel component. It is noted that this is merely intended to provide an example of how truncate unit 310 could work in one scenario. Accordingly, it should be understood that the input data width and processing bit width can vary according to the implementation.

After truncate unit 310, the input pixel data is coupled to chroma-fix calculation circuit 315. A chroma-fix factor is generated by chroma-fix calculation circuit 315 based on the chrominance component values of the input pixel data, and then the chroma-fix factor is provided as an input to piece-wise linear (PWL) function 320. One example of how to generate a chroma-fix factor, in accordance with one implementation, is described in further detail below for pseudo-code 700 (of FIG. 7). It is noted that the terms "chroma-fix factor" and "chroma fix value" can be used interchangeably herein. The output of PWL function 320 is coupled to sign unit 325 and absolute value unit 330. PWL function 320 converts the chroma-fix factor into an intermediate blend factor value which is appropriate for the range of the final blend factor value. The final blend factor value will determine how pixel processing is blended between multiple filters, scalers, sharpeners, and/or other types of processing units.

In one implementation, the sign of the output of PWL function 320 is used to generate the "UseSharpNaro" signal which determines which pair of filters are used to filter the input pixel data. The absolute value of the output of PWL function 320 is the blend factor value "BF" which is coupled to minimum selection unit 340. Any number of optional intermediate blend factor calculation units 335A-N can also be included as part of blend factor calculation unit 300. The outputs of optional intermediate blend factor calculation units 335A-N, labeled as "BF1" and "BFN", are also coupled to minimum selection unit 340. Additionally, a maximum blend factor value, or "MaxBF", is also coupled to minimum selection unit 340 to clip the minimum value selected by minimum selection unit 340 to an upper end of a desired range. The output of minimum selection unit 340 is coupled to maximum selection unit 350. In one implementation, maximum selection unit 350 selects the maximum blend factor value from the output of minimum selection unit 340, labeled as "BFA", and a minimum blend factor value, or "MinBF", which limits the blend factor value to a lower end of the desired range. The output of maximum selection unit 350 is the blend factor value "BF".

While blend factor calculation circuit 300 is described as being implemented with circuitry, it should be understood that this is merely indicative of one particular embodiment. In other implementations, blend factor calculation circuit 300 can be implemented using software (i.e., program instructions) executed by one or more processing units, or blend factor calculation circuit 300 can be implemented using any suitable combination of circuitry, processing units, and program instructions.

Figure 4:
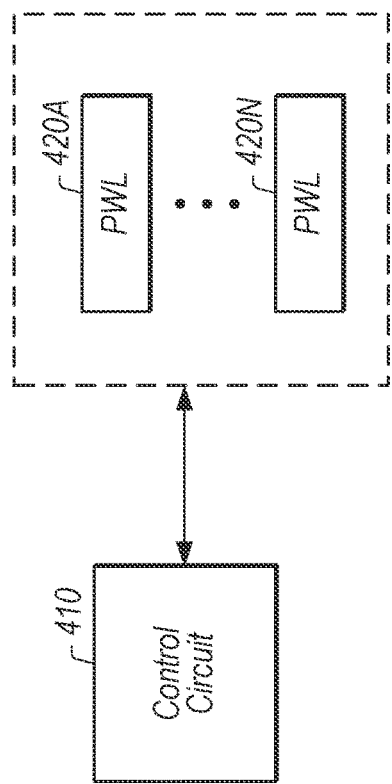
FIG. 4 is a block diagram of one implementation of a chroma fix circuit.

Turning now to FIG. 4, a block diagram of one implementation of a chroma fix circuit 400 is shown. In one implementation, chroma fix circuit 400 includes a control circuit 410 coupled to multiple piece-wise linear (PWL) functions 420A-N. In one implementation, there is a separate PWL function for each different input image format type. In this implementation, control circuit 410 selects the appropriate PWL function 420A-N for the specific type of format of an input image being processed.

For example, if the input image/frame is encoded in a first format, a first PWL function 420A is used. If the input image/frame is in a second format, a second PWL function 420B is used, if the input image/frame is in a third format, a third PWL function 420C is used, and so on. The number N of PWL functions 420A-N can vary according to the implementation and according to the number of image formats that are expected be encountered. Each PWL function 420A-N is tuned according to the corresponding format type. In some cases, if an unexpected image format is encountered and a PWL function specific to this unexpected image format is not available, then control circuit 410 determines which PWL function of PWL functions 420A-N is the best match for this particular image format. In one implementation, the PWL function 420A-N that is selected by control circuit 410 is used as PWL function 320 (of FIG. 3) by blend factor calculation circuit 300.

It should be understood that while chroma fix circuit 400 is described as being implemented with circuitry, it should be understood that this is merely indicative of one particular embodiment. In other implementations, chroma fix circuit 400 can be implemented using software (i.e., program instructions) executed by one or more processing units, or chroma fix circuit 400 can be implemented using any suitable combination of circuitry, processing units, and program instructions. Similarly, the other circuits presented herein in this specification can be implemented using any suitable combination of circuitry, processing units, and program instructions. The circuitry can be fixed (e.g., ASIC) or programmable (e.g., FPGA), depending on the implementation.

Figure 5:
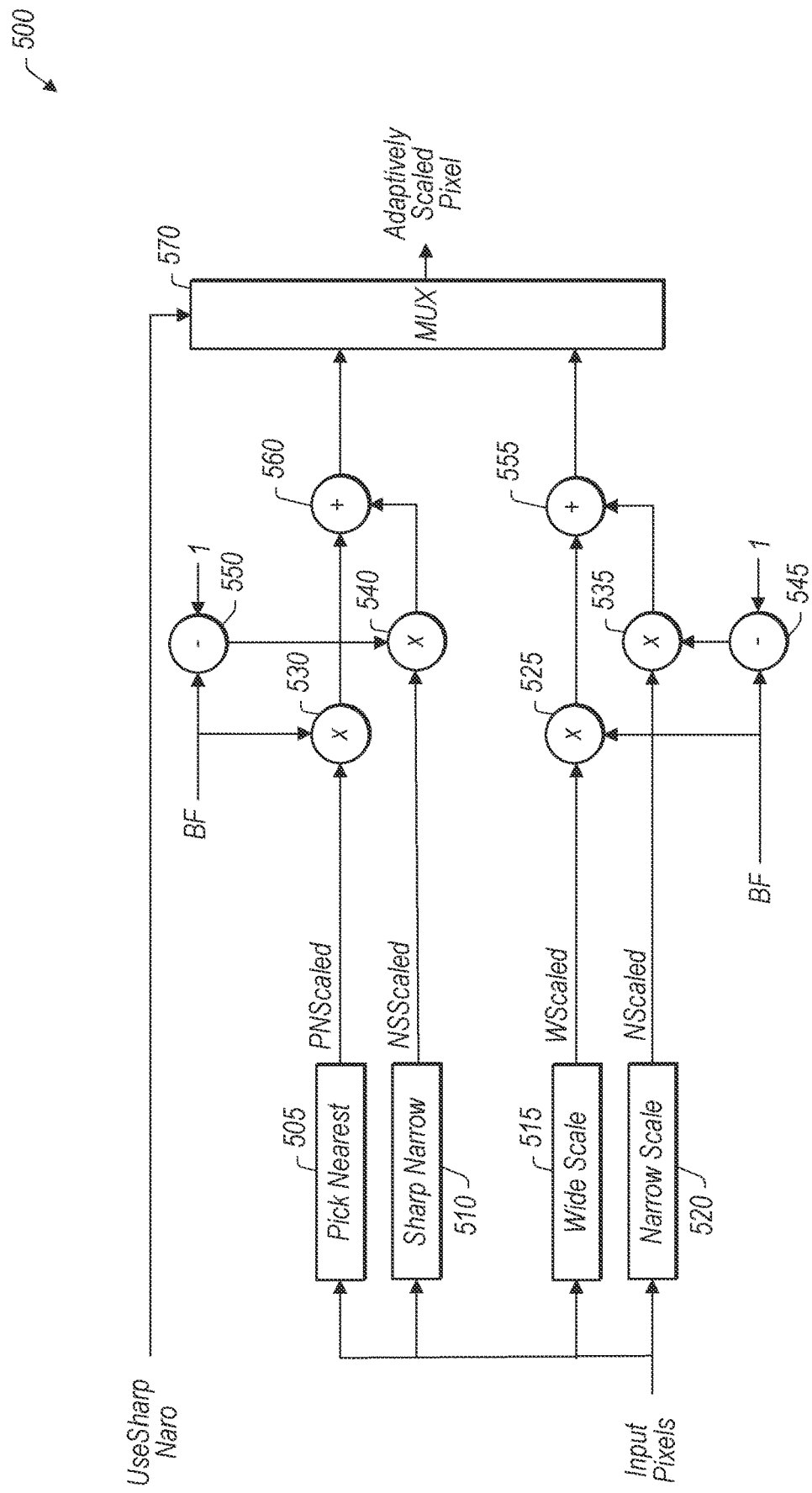
FIG. 5 is a block diagram of one implementation of an adaptive scaling circuit with multiple pairs of scalers.

Referring now to FIG. 5, a block diagram of one implementation of an adaptive scaling circuit 500 with multiple pairs of scalers is shown. The input pixels are coupled to pick nearest scaler 505, sharp narrow scaler 510, wide scaler 515, and narrow scaler 520. Wide scaler 515 scales the input pixels with a wide filter and narrow scaler 520 scales the input pixels with a narrow filter as previously described for chroma fix image processing mechanism 100 (of FIG. 1). The output of wide scaler 515 is coupled to multiplier 525 to be multiplied by the blend factor (BF), and multiplier 535 multiplies the output of narrow scaler 520 by (1-BF). The scaled versions are added by adder 555 to generate scaled pixels which are coupled to multiplexer (or mux) 570.

The pick nearest scaler 505 generates scaled pixels from the input pixels using a wide filter, and sharp narrow unit 510 uses a sharp narrow filter to scale the input pixels. The output of pick nearest scaler 505 is multiplied by BF using multiplier 530 and the output of sharp narrow unit 510 is multiplied by (1-BF) using multiplier 540. The scaled pixels are added by adder 560, and then the scaled pixels are coupled to multiplexer 570. The signal UseSharpNaro determines whether the scaled pixel outputs of the pick nearest scaler 505 and sharp narrow scaler 510 are chosen as the adaptively scaled pixel outputs or if wide scaler 515 and narrow scaler 520 are used to generate the adaptively scaled pixel outputs. In one implementation, the signal UseSharpNaro is generated by blend factor circuit 300 (of FIG. 3) at the output of sign unit 325. It is noted that even though two subtractors 545 and 550 are shown in FIG. 5, a single subtractor can be employed to generate (1-BF) to be coupled to multipliers 535 and 540.

Figure 6:
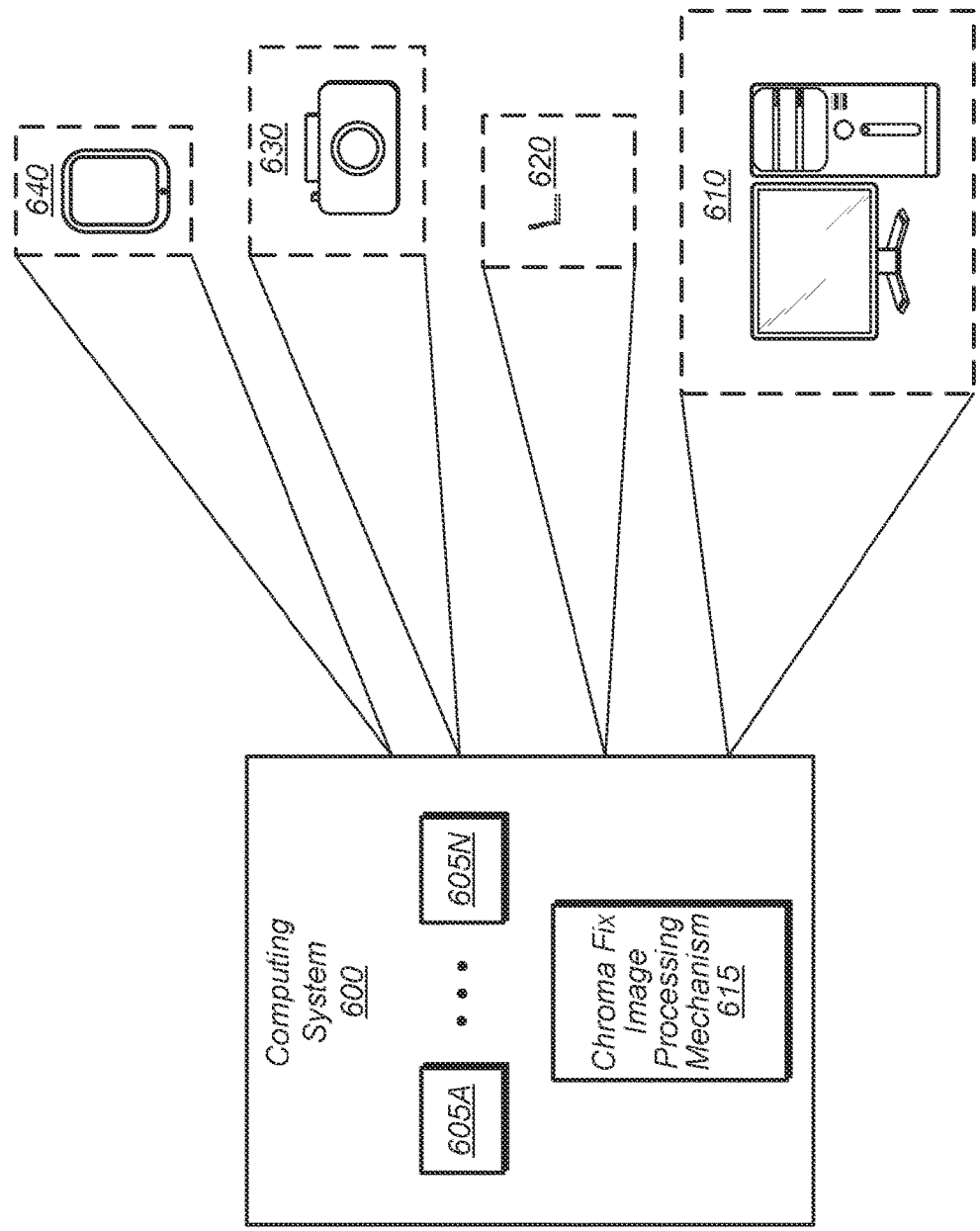
FIG. 6 is a block diagram of one implementation of a computing system.

Turning now to FIG. 6, a block diagram of one implementation of a computing system 600 is shown. As shown, system 600 represents chip, circuitry, components, etc., of a desktop computer 610, laptop computer 620, camera 630, mobile device 640, or otherwise. Other systems, devices, and apparatuses are possible and are contemplated. In the illustrated implementation, the system 600 includes multiple components 605A-N and at least one instance of chroma fix image processing mechanism 615. Components 605A-N are representative of any number and type of components, such as one or more processors, one or more memory devices, one or more peripheral devices, a display, and so on. Chroma fix image processing mechanism 615 includes any of the circuit elements and components presented herein for processing pixel data in a content adaptive manner.

Referring now to FIG. 7, one example of pseudocode 700 for calculating a chroma fix value in accordance with one implementation is shown. In one implementation, pseudocode 700 includes representations of program instructions which are executable by processing elements of a blend factor calculation circuit (e.g., blend factor calculation circuit 300 of FIG. 3). In another implementation, the blend factor calculation circuit includes programmable circuitry (e.g., FPGA) or hard-wired circuitry (e.g., ASIC) for processing input pixel data in accordance with the instructions of pseudocode 700. In other implementations, pseudocode 700 can be deployed using a combination of dedicated circuitry and program instructions executable by a processor.

Depending on the implementation, pseudocode 700 can be used with two input pixel values or three input pixel values. In other implementations, pseudocode 700 can be adjusted with appropriate modifications to work with other numbers of pixel or sub-pixel values. In one implementation, each input pixel value is represented in the RGB color space. Accordingly, in this implementation, each input pixel value has three pixel components red (or R), green (or G), and blue (or B). The pixel components of the input pixel values are referred to as R1, G1, B1 for the first input pixel value P1; R2, G2, B2 for the second input pixel value P2; and R3, G3, B3 for the third input pixel value P3. In other implementations, the input pixel values can be encoded in other color spaces with other types of component values.

Pseudocode 700 includes instructions for calculating the differences between the red, green, and blue pixel component values of adjacent pixels. For example, in the first section of pseudocode 700, the difference in red pixel component values for the first input pixel and the second input pixel is calculated as dR=R1−R2. Similarly, dG=G1−G2 and dB=B1−B2 are calculated for the green and blue pixel component values, respectively, of the first and second input pixels. Then, the maximum of the pixel component value differences is determined as indicated by the instruction: Max=max(dR,dG,dB). Also, the minimum of the pixel component value differences is determined as indicated the instruction: Min=min(dR,dG,dB). Next, the difference between the maximum pixel component value difference and the minimum pixel component value difference is calculated as: MMRGB12=Max−Min. In other words, MMRGB12 is equal to the minimum pixel component value difference subtracted from the maximum pixel component value difference for a first pair of adjacent pixels P1 and P2. If there are an even number of taps (i.e., if there are only two input pixels P2 and P3), then MMRGB12 can be set to 0. In the second section of pseudocode 700, MMRGB23 is calculated in a similar fashion to MMRGB12. MMRGB23 is equal to the minimum pixel component value difference subtracted from the maximum pixel component value difference for a second pair of adjacent pixels P2 and P3.

In the third section of pseudocode 700, the chroma values chrRGB1, chrRGB2, and chrRGB3 are calculated for pixels P1, P2, and P3, respectively. As shown, chrRGB1 is set equal to the difference between the maximum component value from R1, G1, and B1 for P1 and the minimum component value from R1, G1, and B1 for P1. In other words, chrRGB1 is calculated as the minimum (R1,G1,B1) component value subtracted from the maximum (R1,G1,B1) component value for the first pixel P1. If the number of taps is even, chrRGB1 can be set to 0. The other chroma values chrRGB2 and chrRGB3 are calculated in a similar way to chrRGB1. For example, chrRGB2 is calculated as the minimum (R2,G2,B2) value subtracted from the maximum (R2,G2,B2) value, and chrRGB3 is calculated as the minimum (R3,G3,B3) value subtracted from the maximum (R3,G3,B3) value.

Next, the chroma fix value, or "ChromaFixMul12" value, is calculated for pixels P1 and P2. In one implementation, the calculation of the ChromaFixMul12 value is determined based on the enable signal CF2Enable. In this implementation, if CF2Enable is set, then ChromaFixMul12 is set equal to MMRGB12 multiplied by chrRGB1 multiplied by chrRGB2. Otherwise, if CF2Enable is not set, then ChromaFixMul12 is set equal to MMRGB12. The ChromaFixMul23 value is calculated in a similar manner to the ChromaFixMul12 value. For example, in one implementation, the calculation of the ChromaFixMul23 value is determined based on the enable signal CF2Enable. In this implementation, if CF2Enable is set, then ChromaFixMul23 is set equal to MMRGB23 multiplied by chrRGB2 multiplied by chrRGB3. Otherwise, if CF2Enable is not set, then ChromaFixMul23 is set equal to MMRGB23.

Next, the CFMul value is calculated based on the ChromaFixMul12 and ChromaFixMul23 values. For example, in one implementation, if there are 3 taps (i.e., if there are 3 input pixel values), then CFMul is set equal to the maximum of the ChromaFixMul12 and ChromaFixMul23 values. Otherwise, if there are only 2 taps, then CFMul is set equal to the ChromaFixMul23 value.

Then, a first preliminary blend factor value BFA is calculated by providing the CFMul value as an input to a piece-wise linear (PWL) function. This is indicated with the instruction BFA=PWL(CFMul). It is noted that the PWL function is representative of any suitable type of transfer function or mapping function. Next, a second preliminary blend factor value BF is calculated as the absolute value of the first preliminary blend factor value BFA. This calculation is specified with the instruction BF=abs(BFA). Then, if the enable signal BFEnable is set, then the signal UseSharpNaro is set equal to the sign of the first preliminary blend factor value BFA. This is indicated with the instruction UseSharpNaro=sign(BFA). Otherwise, if the enable signal BFEnable is not set, then the signal UseSharpNaro is set equal to zero. This is specified with the instruction UseSharpNaro=0. The UseSharpNaro signal selects which set of filters are used for filtering the input pixel data.

It is noted that pseudocode 700 is representative of a series of programs instructions that can be used in one particular implementation. In other implementations, other types of instructions, similar to those of pseudocode 700, can be used to perform chroma fix calculations and to affect how filtering is performed so as to remove artifacts created by having adjacent high chrominance colors with different hues or by having a highly chromatic color side-by-side with a bright achromatic color. For example, in another implementation, input pixel data in a YCbCr color space is received, and pseudocode 700 can include alterations to calculate brightness from the Y component, hue from the Cb and Cr components, and chroma from the Cb and Cr components. In a further implementation, input pixel data in a RGB color space is received, the input pixel data is converted to the YCbCr color space, and then the altered pseudocode 700 is executed to process the converted input pixel data.

Figure 9:
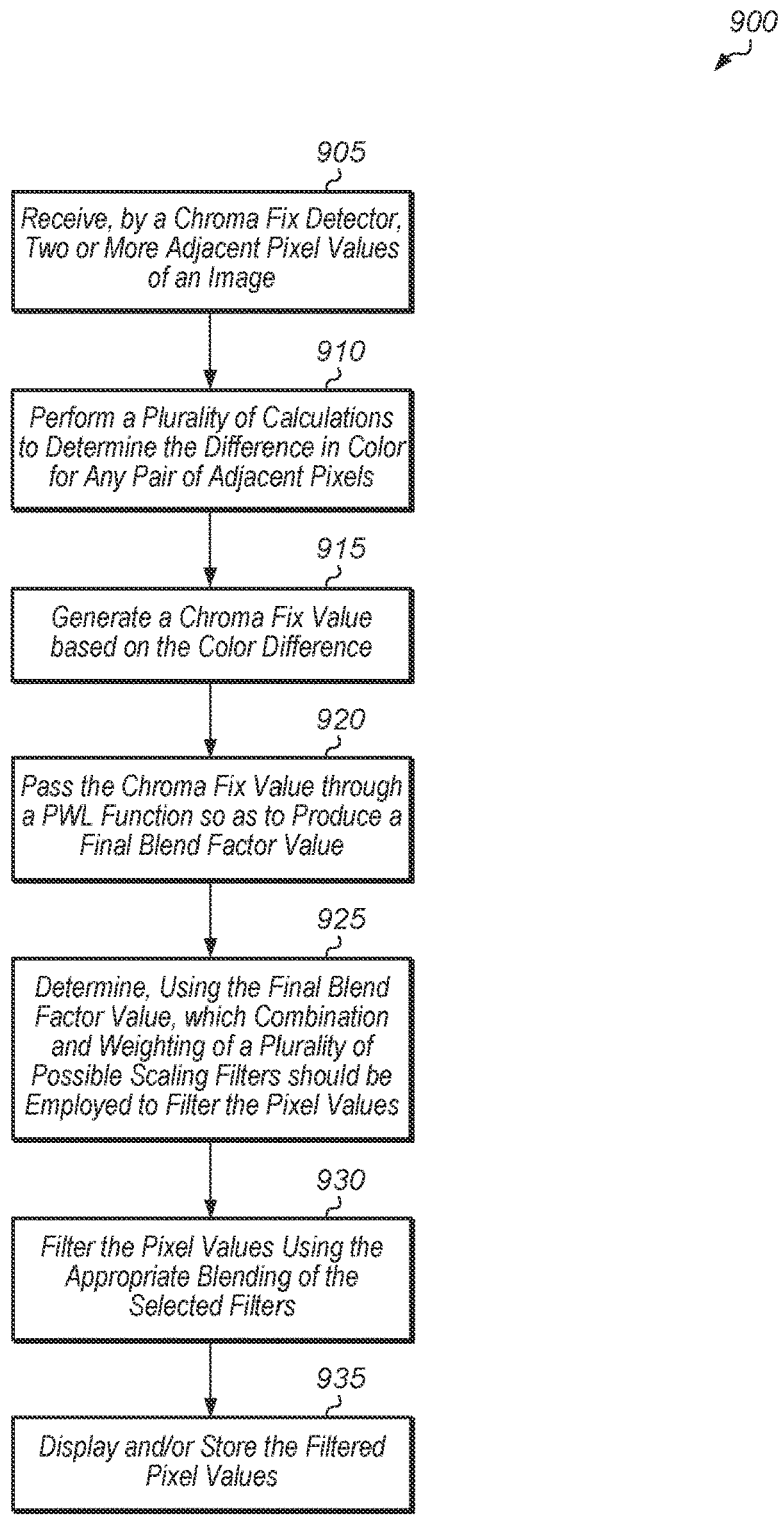
FIG. 9 is a generalized flow diagram illustrating one implementation of a method for detecting and mitigating filtering artifacts related to high chromatic colors.
Figure 10:
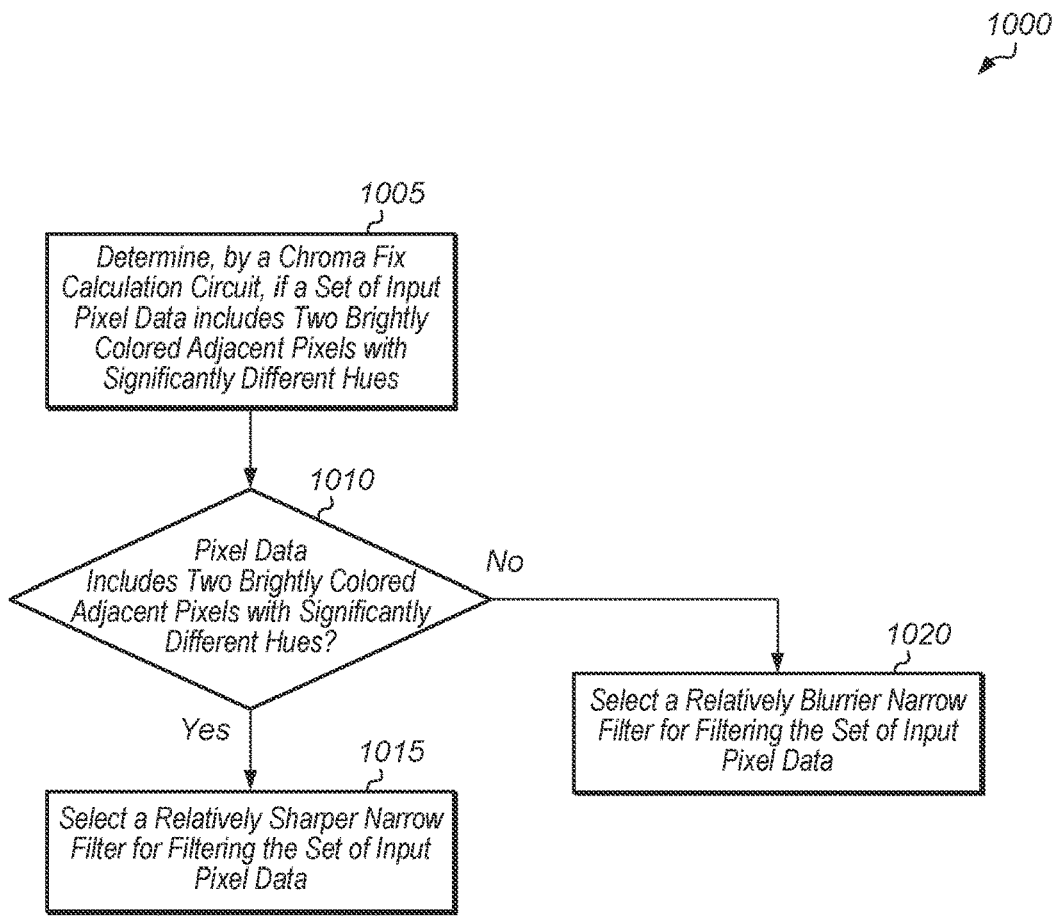
FIG. 10 is a generalized flow diagram illustrating one implementation of a method for determining which type of narrow filter to use when filtering pixel data.
Figure 11:
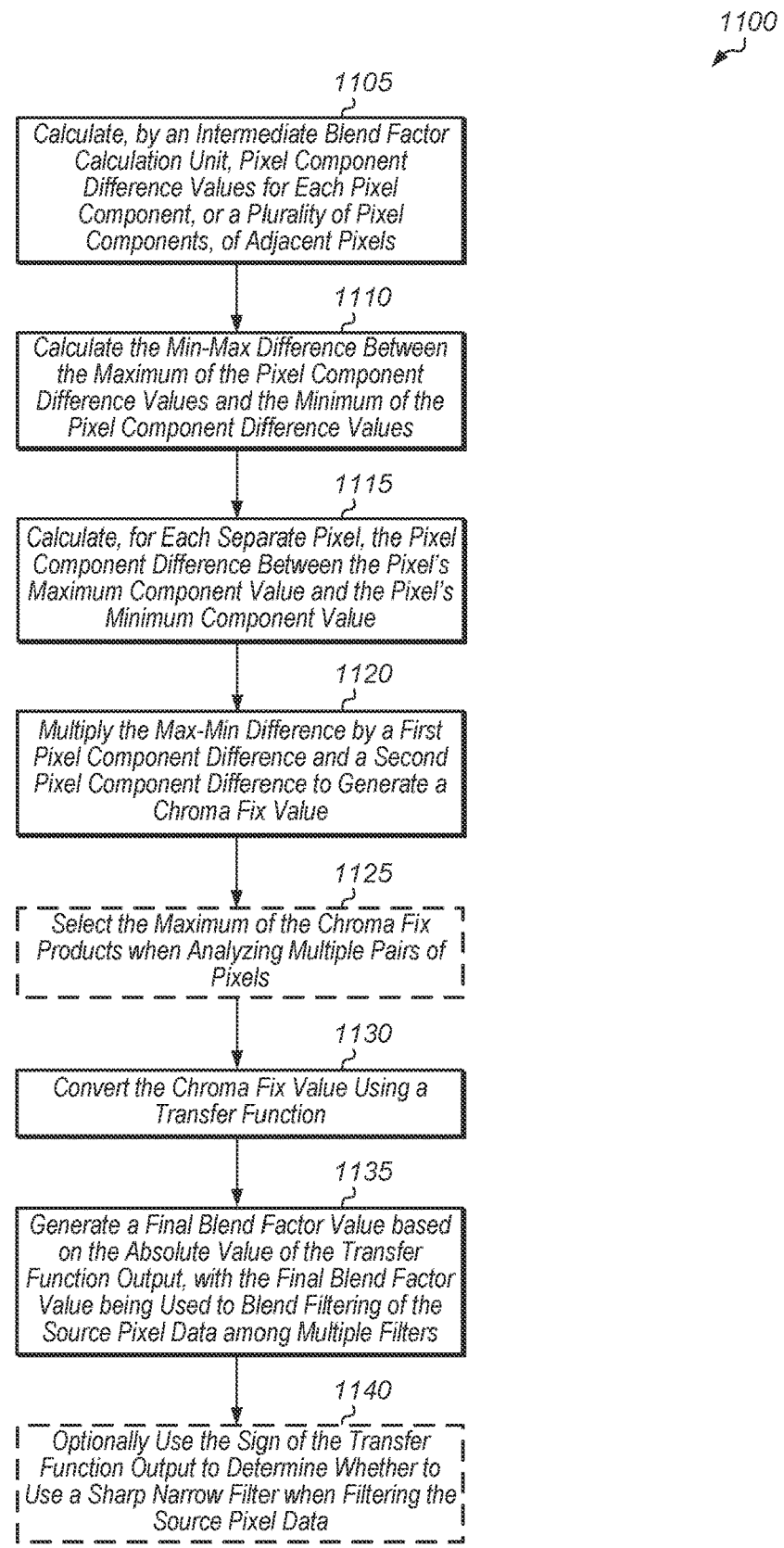
FIG. 11 is a generalized flow diagram illustrating one implementation of a method for calculating a blend factor value based on chromatic values of adjacent pixels.

Turning now to FIG. 8, one implementation of a method 800 for suppressing visual artifacts when two brightly lit colors having significantly different hues are adjacent to each other is shown. For purposes of discussion, the steps in this implementation and those of FIG. 9-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800 (and methods 900-1100).

A blend factor calculation circuit (e.g., blend factor calculation unit 220 of FIG. 2) performs a plurality of calculations to determine whether there are two brightly lit adjacent pixels having significantly different hues in a set of pixel data (block 805). In one implementation, each of the brightly lit pixels is a pixel having a luminance or luma value greater than a first threshold. The luminance or luma value corresponds to the perception of brightness. As used herein, the term "perceived brightness value" or "brightness related value" refers to the luminance value for pixel data in a linear format or the luma value for pixel data in a non-linear format. The value of the first threshold can vary according to the implementation. In one implementation, the significantly different hues are hues are different from each other by more than a second threshold based on how the hues are encoded into numerical values (e.g., as represented on a color wheel). The value of the second threshold can vary according to the implementation. In one implementation, the first threshold is greater than the second threshold. Pseudocode 700 includes instructions for performing the plurality of calculations in block 805 in accordance with one implementation. In other implementations, other types of calculations can be performed to determine whether two brightly lit pixels having significantly different hues are adjacent to each other in a set of pixel data.

As used herein, the term "hue" is defined as a representation of the color of a pixel independent of the intensity or lightness of the pixel. In color theory, hue is one of the main properties of a color, and hue is referred to as the degree to which a stimulus can be described as similar to or different from stimuli that are described as red, orange, yellow, green, blue, or violet. Red, orange, yellow, green, blue, or violet can be referred to as unique hues. A pure white pixel is achromatic and has no hue. Hue can be represented quantitatively by a single number corresponding to an angular position around a central axis on a color space coordinate diagram or color wheel. Pixel data can be represented using hue, saturation, and lightness as an alternative to the RGB color model. Saturation is defined as the colorfulness of a pixel judged in proportion to its brightness. Brightness is defined as an attribute of a visual sensation according to which a pixel appears to emit more or less light. Lightness is defined as the brightness of a pixel judged relative to the brightness of a similarly illuminated pixel that appears to be white or highly transmitting. While brightness refers to the absolute level of the perception of a pixel, lightness is a measure of relative brightness of a pixel.

After block 805, the blend factor calculation circuit generates a blend factor value to suppress visual artifacts if there are two brightly lit adjacent pixels having significantly different hues in the set of pixel data (block 810). Then, a blend circuit (e.g., vertical adaptive scaler 235 of FIG. 2) blends filtering of the set of pixel data between a first filter and a second filter based on the blend factor value so as to generate blended pixel data (block 815). Next, subsequent to filtering, the blended pixel data is driven to a display (block 820). After block 820, method 800 ends.

Referring now to FIG. 9, one implementation of a method 900 for detecting and mitigating filtering artifacts related to high chromatic colors is shown. A chroma fix detector (e.g., blend factor calculation unit 260 of FIG. 2) receives two or more adjacent pixel values of an image (block 905). The two or more pixel values can be in RGB format, YCbCr format, or any of various other formats. In some cases, the chroma fix detector can convert the pixel values from a first color space to a second color space prior to performing subsequent calculations. The two adjacent pixel values can be from an image or a video frame. The detector performs a plurality of calculations to determine the difference in color (i.e., not luminance or luma) for any pair of adjacent pixels (block 910). In other words, the detector determines the difference in color without reference to the luminance or luma values of the two adjacent pixel values. In one implementation, the calculations include subtraction and multiplication operations on the pixel component values of the two adjacent pixels.

Next, the chroma fix detector generates a chroma fix value based on the color difference for any pair of adjacent pixels (block 915). Then, the chroma fix value passes through a piece-wise linear (PWL) function so as to produce a final blend factor value (block 920). Then, the final blend factor value is used for determining which combination and weighting of a plurality of possible scaling filters should be employed to filter the pixel values (block 925). Next, the pixel values are filtered using the appropriate blending of the selected filters (block 930). The filtered pixel values are then displayed and/or stored (block 935). After block 935, method 900 ends. It is noted that the filtering in block 935 can be performed along with or as part of other types of operations (e.g., scaling, sharpening). By using the chroma fix method 900 to perform chroma fixes, predictions can be generated of when black or white lines in otherwise brightly colored areas might occur in an image after filtering. And when these black and white lines are predicted to occur, the correct blending of filters can be selected for performing the filtering so as to prevent the appearance of these black and white lines. The end-result will be better image quality for the user.

Turning now to FIG. 10, one implementation of a method 1000 for determining which type of narrow filter to use when filtering pixel data is shown. A chroma fix calculation circuit determines if a set of input pixel data includes two brightly colored adjacent pixels with significantly different hues (block 1005). In one implementation, significantly different hues are hues that are different by more than a threshold amount. The threshold can vary according to the implementation. If the chroma fix calculation circuit determines that the set of input pixel data includes two brightly colored adjacent pixels adjacent with significantly different hues (conditional block 1010, "yes" leg), then the chroma fix calculation circuit selects a relatively sharper narrow filter for filtering the set of input pixel data (block 1015). With the sharp narrow filter, less blending of pixels will occur, preventing black and white artifacts in brightly colored areas. However, in other areas it causes jaggedness. This is why the chroma fix calculation circuit only uses the sharp narrow filter in cases when two brightly colored pixels with relatively different hues are adjacent to each other.

Otherwise, if the chroma fix calculation circuit determines that the set of input pixel data does not include two brightly colored adjacent pixels with significantly different hues (conditional block 1010, "no" leg), then the chroma fix calculation circuit selects a relatively blurrier narrow filter for filtering the set of input pixel data (block 1020). After blocks 1015 and 1020, method 1000 ends. It is noted that method 1000 can be repeated for each different set of input pixel data.

Referring now to FIG. 11, one implementation of a method 1100 for calculating a blend factor value based on chromatic values of adjacent pixels is shown. A blend factor calculation circuit (e.g., blend factor calculation circuit 300 of FIG. 3) calculates pixel component difference values for each pixel component, of a plurality of pixel components, of adjacent pixels (block 1105). For example, in one implementation, the blend factor calculation circuit calculates a red difference between the red component of a first pixel and the red component of a second pixel, the blend factor calculation circuit calculates a green difference between the green component of the first pixel and the green component of the second pixel, and the blend factor calculation circuit calculates a blue difference between the blue component of the first pixel and the blue component of the second pixel. In this example, the first pixel and the second pixel are assumed to be adjacent. In other implementations, the blend factor calculation circuit calculates pixel component difference values for other numbers and/or types of pixel components of adjacent pixels.

Next, the blend factor calculation circuit calculates the difference between the maximum of the pixel component difference values and the minimum of the pixel component difference values (block 1110). In other words, the intermediate blend factor calculation circuit subtracts the minimum of the pixel component difference values from the maximum of the pixel component difference values in block 1110. The difference generated in block 1110 can be referred to herein as the "max-min difference". It is noted that the blend factor calculation circuit can perform blocks 1105 and 1110 for multiple sets of adjacent pixel pairs. For example, for three pixels P1, P2, and P3 which are adjacent to each other in the source image/frame, the blend factor calculation circuit performs blocks 1105 and 1110 for the pixel pair P1-P2, and the blend factor calculation circuit performs blocks 1105 and 1110 for the pixel pair P2-P3.

Then, the blend factor calculation circuit calculates, for each separate pixel, the difference between the pixel's maximum component value and the pixel's minimum component value (block 1115). For example, in one implementation, for pixel P1, the blend factor calculation circuit subtracts the minimum pixel component value of R1,G1,B1 from the maximum pixel component value of R1,G1,B1. It is noted that the difference calculated in block 1115 can be referred to herein as the "pixel component difference".

Next, the blend factor calculation circuit multiplies the max-min difference calculated for a pair of pixels in block 1110 (e.g., MMRGB12 of pseudocode 700) by a first pixel component difference (e.g., chrRGB1) calculated in block

1115 for a first pixel of the pair and by a second pixel component difference (e.g., chrRGB2) calculated in block 1115 for a second pixel of the pair to generate a chroma fix value (e.g., ChromaFixMul2) (block 1120). If the blend factor calculation circuit performs block 1120 for multiple pairs of pixels, then the detector selects the maximum (e.g., CFMul) of the chroma fix products (optional block 1125). Then, the blend factor calculation circuit converts the chroma fix value using a transfer function (e.g., piece-wise linear (PWL) function) (block 1130). Then, the blend factor calculation circuit generates a final blend factor value (e.g., BF) based on the absolute value of the transfer function output, with the final blend factor value being used to blend filtering of the source pixel data among multiple filters (block 1135). Also, the blend circuit optionally uses the sign of the transfer function output to determine whether to use a sharp narrow filter for the narrow filter of the multiple filters when filtering the source pixel data (block 1140). After block 1140, method 1100 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. The implementations are applied for up-scaled, down-scaled, and non-scaled images. Numerous variations and modifications will become apparent to those skilled in the art once the above disclosure is fully appreciated. It is intended that the following claims be interpreted to embrace all such variations and modifications.

What is claimed is:

1. An apparatus comprising:
a blend factor calculation circuit configured to:
access a set of input pixels;
generate a blend factor value, in response to determining two adjacent pixels of the input pixels have brightness values exceeding a first threshold and hue values that differ by at least a second threshold; and
a blend circuit configured to:
process the set of input pixels using a given filter to generate blended pixel data for, the given filter having been selected based at least in part on the blend factor value; and
store the blended pixel data in a memory device.

2. The apparatus as recited in claim 1, wherein the brightness values correspond to one of luma values or luminance values, and wherein the blend factor calculation circuit is configured to:
generate a chroma fix value which is representative of a degree to which the adjacent pixels have brightness values exceeding the first threshold and hue values that differ by at least the second threshold; and
generate the blend factor value based on the chroma fix value.

3. The apparatus as recited in claim 2, wherein the blend factor calculation circuit is further configured to convert the chroma fix value with a transfer function to generate the blend factor value.

4. The apparatus as recited in claim 1, wherein the blend factor calculation circuit is further configured to:
calculate pixel component difference values for a plurality of pixel components of adjacent pixels; and
calculate a max-min difference between a maximum pixel component difference value and a minimum pixel component difference value.

5. The apparatus as recited in claim 4, wherein the blend factor calculation circuit is further configured to:
calculate, for each separate pixel, a pixel component difference between a maximum pixel component value and a minimum pixel component value; and
calculate a product of the max-min difference multiplied by a first pixel component difference of a first pixel multiplied by a second pixel component difference of a second pixel.

6. The apparatus as recited in claim 5, wherein the blend factor calculation circuit is further configured to:
convert the product with a transfer function to generate a first intermediate blend factor value; and
generate the blend factor value based at least in part on the first intermediate blend factor value.

7. The apparatus as recited in claim 6, wherein the blend factor calculation circuit is further configured to:
set the blend factor value equal to the first intermediate blend factor value responsive to the first intermediate blend factor value being less than one or more other intermediate blend factor values.

8. A method comprising:
generating, by a blend factor calculation circuit, a chroma fix value which is representative of a degree to which a set of input pixels includes two adjacent pixels calculated to have:
hues that differ by at least a first threshold amount; and
brightness values that exceed a second threshold;
generating a blend factor value based on the chroma fix value;
processing the set of input pixels using a given filter to generate blended pixel data, the given filter having been selected based at least in part on the blend factor value; and
storing the blended pixel data in a memory device.

9. The method as recited in claim 8, wherein the adjacent pixels include at least a first pixel and a second pixel, and generating the chroma fix value comprises:
determining if a hue difference between the first pixel and the second pixel is greater than the first threshold;
determining if a luminance value of the first pixel is greater than the second threshold; and
determining if a luminance value of the second pixel is greater than the second threshold.

10. The method as recited in claim 9, wherein the second threshold is greater than the first threshold.

11. The method as recited in claim 8, wherein generating the chroma fix value comprises:
calculating pixel component difference values for a plurality of pixel components of adjacent pixels;

calculating a max-min difference between a maximum pixel component difference value and a minimum pixel component difference value;

calculating, for each separate pixel, a pixel component difference between a maximum pixel component value and a minimum pixel component value; and calculating the chroma fix value as a product of the max-min difference multiplied by a first pixel component difference of a first pixel multiplied by a second pixel component difference of a second pixel.

12. The method as recited in claim 11, further comprising:

converting the chroma fix value with a transfer function to generate a first intermediate blend factor value;

generating the blend factor value based at least in part on the first intermediate blend factor value;

selecting a sharper narrow filter responsive to the product being greater than or equal to zero; and selecting a blurrier narrow filter responsive to the product being less than zero.

13. The method as recited in claim 12, further comprising:

determining if the first intermediate blend factor value is less than one or more other intermediate blend factor values; and setting the blend factor value equal to the first intermediate blend factor value responsive to determining that the first intermediate blend factor value is less than one or more other intermediate blend factor values.

14. The method as recited in claim 12, further comprising:

selecting a first piece-wise linear (PWL) function for generating the first intermediate blend factor value from the chroma fix value if an input image is in a first format; and selecting a second PWL function for generating the first intermediate blend factor value from the chroma fix value if the input image is in a second format, wherein the second PWL function is different from the first PWL function.

15. A system comprising:

a memory device storing a set of input pixels; and circuitry configured to:

generate a chroma fix value which is representative of a degree to which the set of input pixels includes two adjacent pixels calculated to have:

hues that differ by at least first threshold amount; and brightness values that exceed a second threshold;

generate a blend factor value based on the chroma fix value; and process the set of input pixels using a given filter to generate blended pixel data, the given filter having been selected based at least in part on the blend factor value; and convey the blended pixel data to at least one of a display device or a memory device.

16. The system as recited in claim 15, wherein the brightness values correspond to one of luma values or luminance values.

17. The system as recited in claim 15, wherein the circuitry is further configured to convert the chroma fix value with a transfer function to generate the blend factor value.

18. The system as recited in claim 15, wherein the circuitry is further configured to:

calculate pixel component difference values for a plurality of pixel components of adjacent pixels; and calculate a max-min difference between a maximum pixel component difference value and a minimum pixel component difference value.

19. The system as recited in claim 18, wherein the circuitry is further configured to:

calculate, for each separate pixel, a pixel component difference between a maximum pixel component value and a minimum pixel component value; and calculate a product of the max-min difference multiplied by a first pixel component difference of a first pixel multiplied by a second pixel component difference of a second pixel.

20. The system as recited in claim 19, wherein the circuitry is further configured to:

convert the product with a transfer function to generate a first intermediate blend factor value; and generate the blend factor value based at least in part on the first intermediate blend factor value.

* * * * *